(12) United States Patent
Li (10) Patent No.: US 11,776,457 B2
(45) Date of Patent: Oct. 3, 2023

(54) ELECTROSTATIC PROTECTION CIRCUIT AND DISPLAY PANEL

(71) Applicant: TCL CHINA STAR OPTOELECTRONICS TECHNOLOGY CO., LTD., Shenzhen (CN)

(72) Inventor: Yuzhi Li, Shenzhen (CN)

(73) Assignee: TCL CHINA STAR OPTOELECTRONICS TECHNOLOGY CO., LTD, Shenzhen (CN)

( * ) Notice: Subject to any disclaimer, the term of this patent is extended or adjusted under 35 U.S.C. 154(b) by 378 days.

(21) Appl. No.: 17/259,181

(22) PCT Filed: Dec. 21, 2020

(86) PCT No.: PCT/CN2020/138065
§ 371 (c)(1),
(2) Date: Jan. 10, 2021

(87) PCT Pub. No.: WO2022/116307
PCT Pub. Date: Jun. 9, 2022

(65) Prior Publication Data
US 2022/0415243 A1    Dec. 29, 2022

(30) Foreign Application Priority Data
Dec. 2, 2020 (CN) .......................... 202011398712.5

(51) Int. Cl.
*G09G 3/20* (2006.01)
*H02H 7/20* (2006.01)
*H02H 9/04* (2006.01)

(52) U.S. Cl.
CPC ............. *G09G 3/2096* (2013.01); *H02H 7/20* (2013.01); *H02H 9/04* (2013.01);
(Continued)

(58) Field of Classification Search
CPC ......... G09G 3/2096; G09G 2300/0408; G09G 2300/0426; G09G 2330/04;
(Continued)

(56) References Cited

U.S. PATENT DOCUMENTS

| 8,970,999 | B2 * | 3/2015 | Yamazaki | ............ | H02H 9/044 |
| | | | | | 361/56 |
| 2004/0125308 | A1 * | 7/2004 | Park | .................. | G02F 1/136204 |
| | | | | | 349/149 |

(Continued)

FOREIGN PATENT DOCUMENTS

| CN | 202720425 U | | 2/2013 | | |
| CN | 102957140 A | * | 3/2013 | ........... | G09G 3/3648 |

(Continued)

OTHER PUBLICATIONS

PCT International Search Report for International Application No. PCT/CN2020/138065,dated Sep. 1, 2021, 7pp.

(Continued)

*Primary Examiner* — Dharti H Patel
(74) *Attorney, Agent, or Firm* — The Roy Gross Law Firm, LLC; Roy Gross (57) ABSTRACT

The present disclosure provides an electrostatic protection circuit and a display panel, wherein the electrostatic protection circuit includes a first voltage reference unit configured to divide a voltage between an array substrate row driving signal line and a common electrode line once; a second voltage reference unit configured to divide the voltage between the array substrate row driving signal line and the common electrode line twice; and a charge releasing unit that adjusts charge distribution between the array substrate row driving signal line and the common electrode line based on reference voltages provided by the first voltage reference unit and the second voltage reference unit.

19 Claims, 3 Drawing Sheets

(52) U.S. Cl.
CPC .............. *G09G 2300/0408* (2013.01); *G09G 2300/0426* (2013.01); *G09G 2330/04* (2013.01)

(58) Field of Classification Search
CPC ....... G09G 2300/08; G09G 2320/0219; H02H 7/20; H02H 9/04; H01L 27/0248; H01L 27/1214; H01L 27/1225; G02F 1/136204; G02F 1/1368; H10K 59/12
USPC .......................................................... 361/56
See application file for complete search history.

(56) References Cited

U.S. PATENT DOCUMENTS

| | | | | |
|---|---|---|---|---|
| 2005/0168934 | A1* | 8/2005 | Wendel | G11B 33/08 361/724 |
| 2007/0000971 | A1* | 1/2007 | Kumagai | H10B 10/00 228/101 |
| 2008/0291598 | A1* | 11/2008 | Yang | G09G 3/3688 326/83 |
| 2009/0174975 | A1* | 7/2009 | Huang | G09G 3/3611 257/355 |
| 2011/0285690 | A1* | 11/2011 | Li | G09G 3/20 345/212 |
| 2012/0268849 | A1* | 10/2012 | Tomatsu | H01L 27/0266 327/566 |
| 2013/0002624 | A1* | 1/2013 | Yamazaki | H01L 27/1251 345/204 |
| 2013/0221344 | A1* | 8/2013 | Ohmaru | H01L 29/786 257/43 |
| 2013/0250529 | A1* | 9/2013 | Amano | H01L 27/1251 327/566 |
| 2014/0071109 | A1* | 3/2014 | Tseng | H02H 9/041 345/90 |
| 2014/0185170 | A1* | 7/2014 | Yamazaki | H01L 27/1225 361/56 |
| 2015/0255449 | A1* | 9/2015 | Kim | G02F 1/136204 349/40 |
| 2015/0323823 | A1* | 11/2015 | Yamazaki | G02F 1/1368 349/43 |
| 2015/0348961 | A1* | 12/2015 | Isobe | H01L 27/1225 361/56 |
| 2016/0156177 | A1* | 6/2016 | Lin | G06F 3/041 345/173 |
| 2020/0241373 | A1* | 7/2020 | Umezaki | G09G 3/342 |
| 2023/0071094 | A1* | 3/2023 | Son | G11C 19/28 |

FOREIGN PATENT DOCUMENTS

| | | | |
|---|---|---|---|
| CN | 103941908 A | 7/2014 | |
| CN | 205374948 U | 7/2016 | |
| CN | 206040644 U | 3/2017 | |
| CN | 107256687 A | 10/2017 | |
| CN | 107290908 A * | 10/2017 | ........ G02F 1/136204 |

OTHER PUBLICATIONS

PCT Written Opinion of the International Search Authority in International Application No. PCT/CN2020/138065, dated Sep. 1, 2021, 8pp.

* cited by examiner

…

ELECTROSTATIC PROTECTION CIRCUIT AND DISPLAY PANEL

CROSS REFERENCE TO RELATED APPLICATIONS

This application is a National Phase of PCT Patent Application No. PCT/CN2020/138065 having International filing date of Dec. 21, 2020, which claims the benefit of priority of Chinese Application No. 202011398712.5 filed on Dec. 2, 2020. The contents of the above applications are all incorporated by reference as if fully set forth herein in their entirety.

BACKGROUND OF INVENTION

Field of Invention

The present disclosure relates to the field of display technology. More specifically, the present disclosure relates to an electrostatic discharge protection circuit and a display panel.

Description of Prior Art

An oxide semiconductor represented by indium gallium zinc oxide (IGZO) is a channel layer material applied to a thin film transistor technology. The oxide TFT has a wide application prospect in a display panel such as a large-size active matrix color liquid crystal display (AMLCD) and active matrix organic light-emitting diode (AMOLED), since it has advantages such as high mobility, good uniformity, and low production cost. In comparison with a-Si TFT, the oxide TFT has a lower leakage current $I_{off}$ in addition to a higher mobility. Therefore, a display pixel having the oxide TFT as a switch has a stronger ability to hold charges, thereby facilitating improvement of display picture quality. A GOA circuit based on the oxide TFT contributes to fabrication of a narrow frame panel, since the oxide TFT has a high mobility and can realize a smaller layout area. However, a current with a lower oxide leakage current state also causes difficulty in discharge of charge in a GOA signal line, and the risk of the GOA circuit signal line of the oxide TFT panel generating an electro-static discharge (ESD) is greater than that of the a-Si product.

Anti-static breakdown capability of a panel is an important index for measuring reliability of the panel. A conventional design is generally that the GOA signal line is connected to a common line through an electrostatic protection circuit, and accumulated charges in the GOA signal line is conducted to other signal line networks such as the common line, so that a purpose of dispersing charges is achieved, and static electricity is generated due to excessive charge accumulation in a single signal line and a large voltage difference between the GOA signal line and other signal lines. In order to achieve timely dispersion of charge and prevent large loads on the signal line, the electrostatic protection circuit needs to have a small leakage current at a low voltage (the upper limit is the maximum voltage difference between the GOA signal line and the common line) and a large leakage current at a high voltage (the lower limit is the maximum voltage difference between the GOA signal line and the common line).

SUMMARY OF INVENTION

An object of the present disclosure is to provide an electrostatic discharge protection circuit and a display panel in order to reduce a load effect on a row driving signal line of an array substrate and improve reliability of the display panel in view of problems in the prior art.

To achieve the above object, the present disclosure provides an electrostatic protection circuit comprising:

A first voltage reference unit configured to divide a voltage between an array substrate row driving signal line and a common electrode line once;

A second voltage reference unit configured to divide the voltage between the array substrate row driving signal line and the common electrode line twice;

A charge releasing unit that adjusts the charge distribution between the array substrate row driving signal line and the common electrode line based on the reference voltages provided by the first voltage reference unit and the second voltage reference unit;

The first voltage reference unit, the second voltage reference unit, and the charge releasing unit are connected between the array substrate row driving signal line and the common electrode line, respectively;

A potential midpoint of the first voltage reference unit is connected to a potential midpoint of the second voltage reference unit;

At least two reference voltage output terminals of the second voltage reference unit are connected with reference voltage input terminals of the charge releasing unit.

The present disclosure also provides a display panel comprising an electrostatic protection circuit as described above.

Beneficial effects of the present disclosure are as follows: in the case of high voltage (U>20V), the electrostatic protection circuit of the present disclosure has a larger leakage current than that of a conventional electrostatic protection circuit, so that the cumulative electrostatic charge of the array substrate row driving signal line can be released in time, and the phenomenon of cross-line electrostatic protection of the circuit can be prevented. When the voltage is low (U ≤ 20V), the load of the array substrate row driving signal line is not affected, and the reliability of the display panel is improved.

DESCRIPTION OF DRAWINGS

In order that the technical solution of the present disclosure may be explained more clearly, a brief description will be given below of the drawings required for describing the embodiments.

Reference numerals 1, first voltage reference unit; 101, first voltage dividing module; 102, second voltage dividing module;

2, second voltage reference unit; 201, third voltage dividing module; 202, fourth voltage dividing module;

3, charge releasing unit;

T1, first thin film field effect transistor; T2, second thin film field effect transistor;

T3, third thin film field effect transistor; T4, fourth thin film field effect transistor;

T5, fifth thin film field effect transistor; T6, sixth thin film field effect transistor;

T7, seventh thin film field effect transistor; T8, eighth thin film field effect transistor;

T9, ninth thin film field effect transistor; T10, tenth thin film field effect transistor;

T11, eleventh thin film field effect transistor; T12, twelfth thin film field effect transistor;

A. array substrate row driving signal line; B. common electrode line.

DETAILED DESCRIPTION OF PREFERRED EMBODIMENTS

Specific embodiments of the present disclosure will now be described in detail with reference to the accompanying drawings. It will be appreciated by those skilled in the art that the embodiments described below by reference to the accompanying drawings are exemplary and are intended for purposes of understanding and not intended to limit the present disclosure. In the following, the same reference numerals refer to the same or similar elements throughout. In addition, terms such as "first", "second", etc. are only used to distinguish one component from another component, and do not limit the component to the above-mentioned terms.

Figure 1:
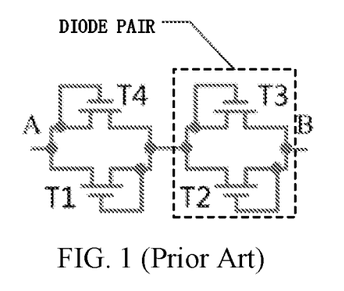
FIG. 1 shows a schematic diagram of the prior art.

After analyzing and studying the prior art, as shown in FIG. 1, TFTs in an electrostatic protection circuit can be connected in the form of diode pairs without changing specific structure of the TFTs, so that a channel width-to-length ratio of the TFT is increased equivalently, thereby achieving the purpose of adjusting leakage current of the electrostatic protection circuit. If the channel width of the TFT is increased in the ESD circuit, the electrostatic protection circuit increases the leakage current at both the low voltage and the high voltage. In the prior art, since the leakage current $I_{off}$ of a-Si product TFTs is high, the GOA signal line has more charge releasing channels, the width-to-length ratio of the TFT in the electrostatic protection circuit can be designed to a relatively small level, and even the electrostatic protection circuit can be eliminated. However, the leakage current $I_{off}$ of the oxide TFT such as IGZO is relatively low, and the charge is difficult to be released in the off-state condition. Therefore, the electrostatic protection circuit needs to have a relatively strong ability to release the charge. It is obvious that the electrostatic protection circuit of the diode type needs to be capable of increasing the width-to-length ratio of the TFT and the leakage current of the electrostatic protection circuit, but this will also increase the load of the GOA signal line and affect normal driving of the GOA circuit.

Therefore, the present disclosure is intended to provide an electrostatic protection circuit in which a TFT of a diode pair of TFTs is used as a first voltage reference unit 1, and a plurality of thin film field effect transistors connected in series are used as a second voltage reference unit 2, so that the width-to-length ratio of the TFT can be adjusted equivalently by rationally arranging the arrangement of the TFTs in the first voltage reference unit 1, so that the electrostatic protection circuit has a small load in a low voltage condition and does not affect the normal operation of the GOA circuit, and can also have a large charge releasing capability in a high voltage, thereby preventing the GOA input signal line from generating static electricity, thereby improving the reliability of the display panel.

Figure 2:
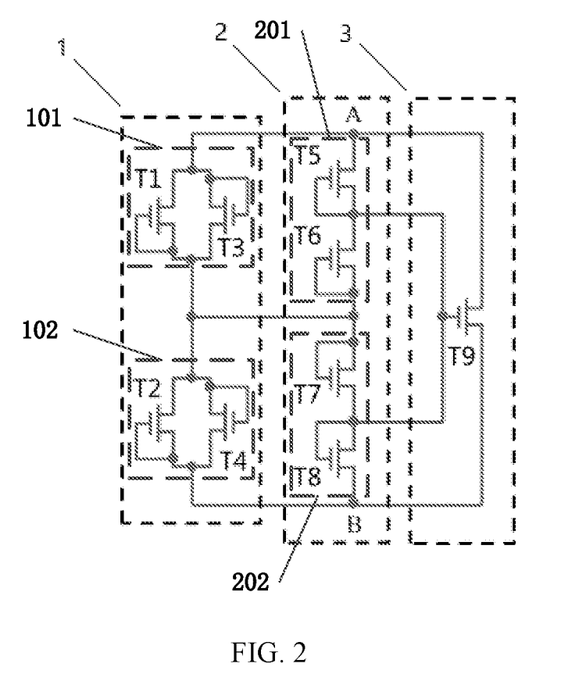
FIG. 2 shows a schematic diagram of an example of an electrostatic protection circuit according to the present disclosure.

Hereinafter, an electrostatic protection circuit according to the present disclosure will be described in detail with reference to the accompanying drawings. As shown in FIG. 2, the electrostatic protection circuit according to the present disclosure comprises a first voltage reference unit 1, a second voltage reference unit 2, and a charge releasing unit 3. The first voltage reference unit 1, the second voltage reference unit 2, and the charge releasing unit 3 are connected between an array substrate row driving signal line A and a common electrode line B, respectively. The voltage between the array substrate row driving signal line A and the common electrode line B is divided by the first voltage reference unit 1, and the voltage between the array substrate row driving signal line A and the common electrode line B is further divided by the second voltage reference unit 2. The charge releasing unit 3 adjusts the charge distribution between the array substrate row driving signal line A and the common electrode line B according to the reference voltages supplied from the first voltage reference unit 1 and the second voltage reference unit 2, so that when the voltage between the array substrate row driving signal line A and the common electrode line B is low (for example, the voltage U ≤ 20V), the electrostatic protection circuit has a small leakage current, and does not affect the load of the array substrate row driving signal line, thereby improving the reliability of the display panel. When the voltage between the array substrate row driving signal line A and the common electrode line B is high (for example, the voltage U>20V), the electrostatic protection circuit can rapidly increase the leakage current, so that the static electricity accumulated by the array substrate row driving signal line A can be released in time, thereby preventing the problem of electrostatic discharge across lines, and ensuring that the load of the array substrate row driving input signal is not affected during normal operation.

In this embodiment, a potential midpoint of the first voltage reference unit 1 is connected to a potential midpoint of the second voltage reference unit 2, and a reference voltage supplied to the charge releasing unit 3 is output by an output terminal of the reference voltage in the second voltage reference unit 2 through the joint action of the first voltage reference unit 1 and the second voltage reference unit 2. In the present embodiment, the second voltage reference unit 2 has at least two reference voltage outputs.

In the present embodiment, the first voltage reference unit 1 may comprise a first voltage dividing module 101 and a second voltage dividing module 102. The two voltage dividing modules are connected in series. The potential midpoint of the first voltage reference unit 1 is located between the two voltage dividing modules. Specifically, an input terminal of the first voltage dividing module 101 is connected to the array substrate row driving signal line A, an output terminal of the first voltage dividing module 101 and an input terminal of the second voltage dividing module 102 are both connected to the potential midpoint of the first voltage reference unit 1, and an output terminal of the second voltage dividing module 102 is connected to the common electrode line B. The first voltage reference unit 1 enables the electrostatic protection circuit to increase the leakage current at both high and low voltages.

In a first embodiment, as shown in FIG. 2, the first voltage dividing module 101 may comprise a first thin film field effect transistor T1 and a second thin film field effect transistor T2. The first thin film field effect transistor T1 and the second thin film field effect transistor T2 are connected in the form of a diode pair, which is capable of equivalently increasing the width-to-length ratio of the thin film field effect transistor without changing the structure of the thin film field effect transistor, thereby increasing the leakage current of the electrostatic protection circuit and increasing the charge releasing capability of the electrostatic protection circuit. A gate electrode of the first thin film field effect transistor T1, a first electrode of the first thin film field effect transistor T1, and a second electrode of the second thin film field effect transistor T2 are connected to the potential midpoint of the first voltage reference unit 1. A second electrode of the first thin film field effect transistor T1, a gate of the second thin film field effect transistor T2, and a first electrode of the second thin film field effect transistor T2 are all connected to the array substrate row driving signal line A. In this embodiment, the first electrode may be a source electrode or a drain electrode, the second electrode may be a source electrode or a drain electrode, and the types of the first electrode and the second electrode are different.

In a first embodiment, as shown in FIG. 2, the second voltage dividing module 102 may comprise a third thin film field effect transistor T3 and a fourth thin film field effect transistor T4. The third thin film field effect transistor T3 and the fourth thin film field effect transistor T4 may also be connected in the form of a diode pair. A gate of the third thin film field effect transistor T3, a first electrode of the third thin film field effect transistor T3, and a second electrode of the fourth thin film field effect transistor T4 are connected to the common electrode line B. A second electrode of the third thin film field effect transistor T3, a gate of the fourth thin film field effect transistor T4, and a first electrode of the fourth thin film field effect transistor T4 are all connected to the potential midpoint of the first voltage reference unit 1. In this embodiment, the first electrode may be a source electrode or a drain electrode, the second electrode may be a source electrode or a drain electrode, and the types of the first electrode and the second electrode are different.

Although the leakage current of the electrostatic protection circuit can be improved by connecting the thin film field effect transistors in the form of diode pairs, when the voltage between the array substrate row driving signal line A and the common electrode line B is low, the load of the array substrate row driving signal line A is increased, and normal driving operation of the array substrate row driving signal line A is affected. For this reason, the second voltage reference unit 2 is added to the first voltage reference unit 1, so that when the voltage between the array substrate row driving signal line A and the common electrode line B is low, the electrostatic protection circuit has a small leakage current, and the array substrate row driving signal line A has a small load without affecting the driving operation of the array substrate row driving signal line A.

In the present embodiment, the second voltage reference unit 2 comprises a third voltage dividing module 201 and a fourth voltage dividing module 202. The two voltage dividing modules are connected in series. The potential midpoint of the second voltage reference unit 2 is located between the two voltage dividing modules. Specifically, a voltage dividing input terminal of the third voltage dividing module 201 is connected to the array substrate row driving signal line A, a reference voltage output terminal of the third voltage dividing module 201 is connected to at least one reference voltage input terminal of the charge releasing unit 3, and a voltage dividing output terminal of the third voltage dividing module 201 and a voltage dividing input terminal of the fourth voltage dividing module 202 are connected to the potential midpoint of the second voltage reference unit 2. A reference voltage output terminal of the fourth voltage dividing module 202 is connected to at least one reference voltage input terminal of the charge releasing unit 3, and a voltage dividing output terminal of the fourth voltage dividing module 202 is connected to the common electrode line B. In this embodiment, the first voltage reference unit 1 and the second voltage reference unit 2 are used to supply a reference voltage to the charge releasing unit 3 and control switching state of the charge releasing unit 3, so that the charge between the array substrate row driving signal line A and the common electrode line B is redistributed. Further, on the basis of the first voltage reference unit 1, the second voltage reference unit 2 further divides the voltage between the array substrate row driving signal line A and the common electrode line B, so that when the voltage between the array substrate row driving signal line A and the common electrode line B is low ($U \leq 20$), the charge releasing unit 3 is turned on due to a high potential, thereby ensuring that the electrostatic protection circuit has a small leakage current under normal operation conditions of the circuit. At the same time, in this way, the problem of increasing the load of the array substrate row driving signal line A under the condition of low voltage is overcome when the thin film field effect transistors are connected in the form of a diode pair, and the normal operation of the array substrate row driving signal line A is ensured.

In the first embodiment, as shown in FIG. 2, the third voltage dividing module 201 comprises a fifth thin film field effect transistor T5 and a sixth thin film field effect transistor T6. A first electrode of the fifth thin film field effect transistor T5 is connected to the array substrate row driving signal line A. A gate electrode of the fifth thin film field effect transistor T5, a second electrode of the fifth thin film field effect transistor T5, and a first electrode of the sixth thin film field effect transistor T6 are all connected to the reference voltage output terminal of the third voltage dividing module 201. A gate of the sixth thin film field effect transistor T6 and the second electrode of the sixth thin film field effect transistor T6 are both connected to the potential midpoint of the second voltage reference unit 2. In this embodiment, the first electrode may be a source electrode or a drain electrode, the second electrode may be a source electrode or a drain electrode, and the types of the first electrode and the second electrode are different.

In the first embodiment, as shown in FIG. 2, the fourth voltage dividing module 202 comprises a seventh thin film field effect transistor T7 and an eighth thin film field effect transistor T8. A gate of the seventh thin film field effect transistor T7 and a first electrode of the seventh thin film field effect transistor T7 are both connected to the potential midpoint of the second voltage reference unit 2. A second electrode of the seventh thin film field effect transistor T7, a gate of the eighth thin film field effect transistor T8, and a first electrode of the eighth thin film field effect transistor T8 are all connected to the reference voltage output terminal of the fourth voltage dividing module 202. A second electrode of the eighth thin film field effect transistor T8 is connected to the common electrode line B. In this embodiment, the first electrode may be a source electrode or a drain electrode, the second electrode may be a source electrode or a drain electrode, and the types of the first electrode and the second electrode are different.

In the first embodiment, as shown in FIG. 2, the charge releasing unit 3 comprises a ninth thin film field effect transistor T9, which is turned on under the action of the reference voltage provided by the second voltage reference unit 2 to complete the charge releasing operation.

As shown in FIG. 2, when the array substrate row driving signal line A and the common electrode line B are at a high voltage (voltage U>20V), the first voltage dividing module 101 and the second voltage dividing module 102 in the first voltage reference unit 1 perform voltage dividing operation, and at the same time, the thin film field effect transistors in the third voltage dividing module 201 and the fourth voltage dividing module 202 in the second voltage reference unit 2 generate the reference voltage based on the change of the current and voltage. According to the voltage value between the array substrate row driving signal line A and the common electrode line B, the ninth thin film field effect transistor T9 in the charge releasing unit 3 conducts the charge releasing based on the reference voltage generated by the third voltage dividing module 201 and the fourth voltage dividing module 202 until the voltage between the array substrate row driving signal line A and the common electrode line B decreases to a low voltage (voltage U ≤ 20V), and the ninth thin film field effect transistor T9 stops releasing the charge.

When the array substrate row driving signal line A and the common electrode line B are at a low voltage (voltage U ≤ 20V), the second voltage reference unit 2 is added to divide the voltage, so that the reference voltage unit side of the electrostatic protection circuit has a small leakage current, thereby ensuring that the potential of the ninth thin film field effect transistor T9 in the charge releasing unit 3 is lower than the potential of the reference voltage unit side of the electrostatic protection circuit, preventing the potential of the ninth thin film field effect transistor T9 from being too high, thereby causing the ninth thin film field effect transistor T9 to be turned on, thereby ensuring that the electrostatic protection circuit has a small leakage current under normal operation conditions of the circuit.

Figure 3:
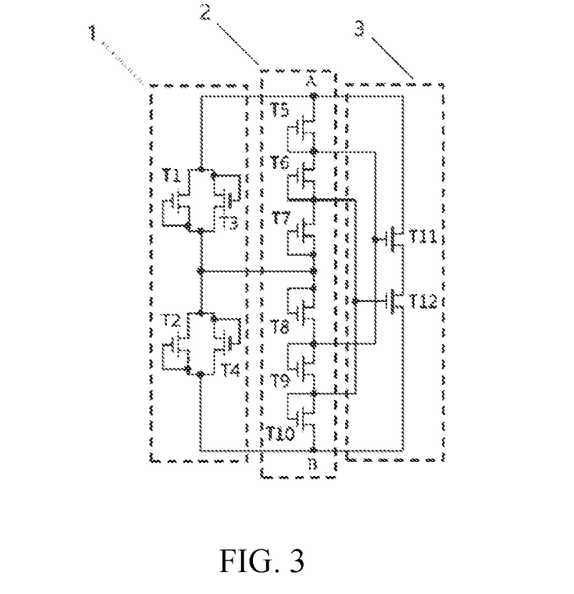
FIG. 3 shows a schematic diagram of another example of the electrostatic protection circuit according to the present disclosure.

In an actual electrostatic protection process, when a single thin film field effect transistor is used for discharging charge, a high voltage across the source and drain electrodes may exist, thereby causing damage to the thin film field effect transistor. To overcome this problem, the present embodiment appropriately adjusts the number of TFTs in the second voltage reference unit 2 and the charge releasing unit 3 without changing the first voltage reference unit 1. The details are as follows:

In the second embodiment, as shown in FIG. 3, the third voltage dividing module 201 is composed of the fifth thin film field effect transistor T5, the sixth thin film field effect transistor T6, and the seventh thin film field effect transistor T7. The first electrode of the fifth thin film field effect transistor T5 is connected to the array substrate row driving signal line A. The gate electrode of the fifth thin film field effect transistor T5, the second electrode of the fifth thin film field effect transistor T5, and the first electrode of the sixth thin film field effect transistor T6 are all connected to the first reference voltage output terminal of the third voltage dividing module 201. The gate electrode of the sixth thin film field effect transistor T6, the second electrode of the sixth thin film field effect transistor T6, and the first electrode of the seventh thin film field effect transistor T7 are all connected to the second reference voltage output terminal of the third voltage dividing module 201. The gate of the seventh thin film field effect transistor T7 and the second electrode of the seventh thin film field effect transistor T7 are both connected to the potential midpoint of the second voltage reference unit 2. In this embodiment, the first electrode may be a source electrode or a drain electrode, the second electrode may be a source electrode or a drain electrode, and the types of the first electrode and the second electrode are different.

In a second embodiment, as shown in FIG. 3, the fourth voltage dividing module 202 comprises the eighth thin film field effect transistor T8, a ninth thin film field effect transistor T9, and a tenth thin film field effect transistor T10. The first electrode of the eighth thin film field effect transistor T8 and the gate of the eighth thin film field effect transistor T8 is connected to the potential midpoint of the second voltage reference unit 2. The second electrode of the eighth thin film field effect transistor T8, a gate of the ninth thin film field effect transistor T9, and a first electrode of the ninth thin film field effect transistor T9 are all connected to the first reference voltage output terminal of the fourth voltage dividing module 202. A second electrode of the ninth thin film field effect transistor T9, a gate of the tenth thin film field effect transistor T10, and a first electrode of the tenth thin film field effect transistor T10 are all connected to the second reference voltage output terminal of the fourth voltage dividing module 202. A second electrode of the tenth thin film field effect transistor T10 is connected to the common electrode line B.

In a second embodiment, as shown in FIG. 3, the charge releasing unit 3 comprises an eleventh thin film field effect transistor T11 and a twelfth thin film field effect transistor T12. A gate of the eleventh thin film field effect transistor T11 is connected to the first reference voltage output terminal in the third voltage dividing module 201 and the first reference voltage output terminal in the fourth voltage dividing module 202. a first electrode of the eleventh thin film field effect transistor T11 is connected to the array substrate row driving signal line A, and a second electrode of the eleventh thin film field effect transistor T11 and a first electrode of the twelfth thin film field effect transistor T12 are connected. A gate of the twelfth thin film field effect transistor T12 is connected to the second reference voltage output terminal in the third voltage dividing module 201 and the second reference voltage output terminal in the fourth voltage dividing module 202, and a second electrode of the twelfth thin film field effect transistor T12 is connected to the common electrode line B.

As shown in FIG. 3, when the array substrate row driving signal line A and the common electrode line B are at a high voltage (voltage U>20V), the first voltage dividing module 101 and the second voltage dividing module 102 in the first voltage reference unit 1 perform voltage dividing operation. At the same time, the thin film field effect transistors in the third voltage dividing module 201 and the fourth voltage dividing module 202 in the second voltage reference unit 2 generate the reference voltage based on the change of the current and voltage. In this embodiment, the second voltage reference unit 2 can supply two different sets of reference voltages. The eleventh thin film field effect transistor T11 and the twelfth thin film field effect transistor T12 in the charge releasing unit 3 are respectively turned on on the basis of different reference voltages, and the charge releasing operation is performed. Since the eleventh thin film field effect transistor T11 and the twelfth thin film field effect transistor T12 are both turned on, it is possible to prevent the problem of high cross-voltage occurring in a single TFT, and to ensure the safety of the TFT. Until the voltage between the array substrate row driving signal line A and the common electrode line B is reduced to a low voltage (voltage U ≤ 20V), the eleventh thin film field effect transistor T11 and the twelfth thin film field effect transistor T12 in the charge releasing unit 3 stop releasing charge.

When the array substrate row driving signal line A and the common electrode line B are at a low voltage (voltage U ≤ 20V), the second voltage reference unit 2 is added to divide the voltage, so that the reference voltage unit side of the electrostatic protection circuit has a small leakage current, thereby ensuring that the potential of the ninth thin film field effect transistor T9 in the charge releasing unit 3 is lower than the potential of the reference voltage unit side of the electrostatic protection circuit, preventing the potential of any thin film field effect transistor in the charge releasing unit 3 from being too high to turn on any thin film field effect transistor, thereby ensuring that the electrostatic protection circuit has a small leakage current under normal operation conditions of the circuit.

In the present embodiment, in order to reduce the difficulty of the fabrication process, the thin film field effect transistors generally use transistors of the same material. Therefore, in the specific implementation, all the thin film transistors are N-type thin film transistors. Note that the N-type thin film transistor is in the ON state when its gate potential is high, and in the OFF state when its gate potential is low.

Under the same conditions, the electrostatic protection circuit in the prior art, the electrostatic protection circuit in the first embodiment, and the electrostatic protection circuit in the second embodiment are experimentally verified.

Figure 4:
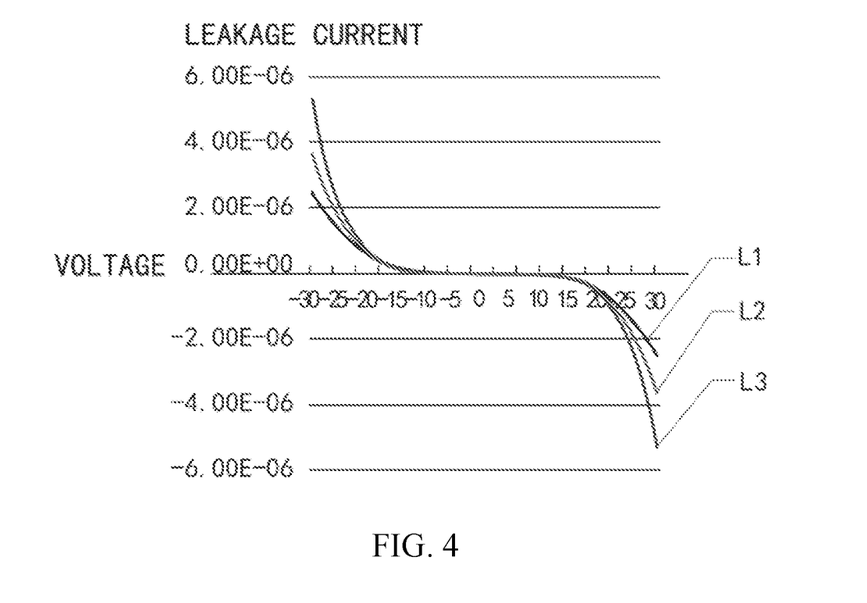
FIG. 4 is a graph showing a comparison of experimental data of the electrostatic protection circuit according to the present disclosure and an electrostatic protection circuit according to the prior art for an ability to release charge under low voltage conditions.

As shown in FIG. 4, a horizontal axis is the voltage between the array substrate row driving signal line A and the common electrode line B, and a vertical axis is the leakage current of the electrostatic protection circuit. L1 is an electrostatic protection circuit in the prior art; L2 is the electrostatic protection circuit according to the first embodiment of the present disclosure; L3 is the electrostatic protection circuit as described in the second embodiment of the present disclosure.

When the voltage between the array substrate row driving signal line A and the common electrode line B is at a low voltage (voltage U ≤ 20V), the leakage current of the electrostatic protection circuit according to the present disclosure is equivalent to the leakage current of the electrostatic protection circuit according to the prior art, and does not affect the load increase of the array substrate row driving signal line A.

Figure 5:
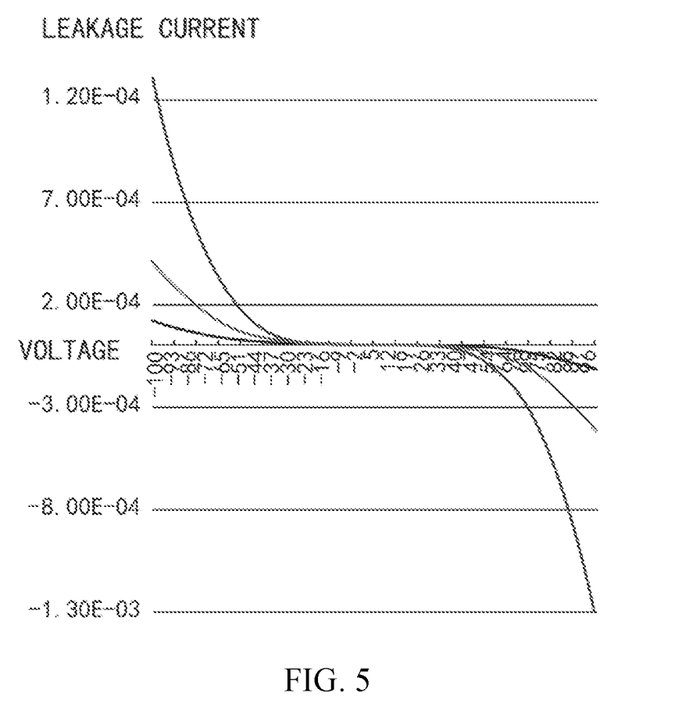
FIG. 5 is a graph showing a comparison of experimental data of the electrostatic protection circuit according to the present disclosure and the electrostatic protection circuit according to the prior art for an ability to release charge under high voltage conditions.

As shown in FIG. 5, a horizontal axis is the voltage between the array substrate row driving signal line A and the common electrode line B, and a vertical axis is the leakage current of the electrostatic protection circuit. L1 is an electrostatic protection circuit in the prior art; L2 is the electrostatic protection circuit according to the first example of the present disclosure; L3 is an electrostatic protection circuit as described in the second embodiment of the present disclosure.

When the voltage between the array substrate row driving signal line A and the common electrode line B is at a high voltage (voltage U>20V), the leakage current of the electrostatic protection circuit according to the present disclosure has a greater charge releasing capability than the leakage current of the electrostatic protection circuit according to the prior art, so that the accumulated electrostatic charge of the array substrate row driving signal line can be released in time, and the phenomenon of cross-line electrostatic protection of the circuit is prevented.

On the basis of the above-described electrostatic protection circuit, the present embodiment further discloses a display panel comprising the electrostatic protection circuit as described above. The material of the thin film field effect transistor in the display panel is indium gallium zinc oxide (IGZO). The display panel may be used for products or components having a display function such as a mobile phone, a tablet computer, a television, a display module, a notebook computer, a digital photo frame, a navigator, a smart watch, a fitness wrist strap, and a personal digital assistant. For an implementation of the display panel, reference may be made to the embodiment of the display substrate described above, and details are not repeated.

The foregoing description is merely a preferred embodiment of the present disclosure, and it should be noted that several modifications and embellishments may be made by those of ordinary skill in the art without departing from the principles of the present disclosure, and such modifications and embellishments are also considered to be within the scope of the present disclosure.

What is claimed is:

1. An electrostatic protection circuit, comprising:
a first voltage reference unit configured to divide a voltage between an array substrate row driving signal line and a common electrode line for a first time;
a second voltage reference unit configured to divide the voltage between the array substrate row driving signal line and the common electrode line for a second time;
a charge releasing unit that adjusts charge distribution between the array substrate row driving signal line and the common electrode line based on reference voltages provided by the first voltage reference unit and the second voltage reference unit,
wherein the first voltage reference unit, the second voltage reference unit, and the charge releasing unit are connected between the array substrate row driving signal line and the common electrode line, respectively;
a potential midpoint of the first voltage reference unit is connected to a potential midpoint of the second voltage reference unit; and
at least two reference voltage output terminals of the second voltage reference unit are connected with reference voltage input terminals of the charge releasing unit.

2. The electrostatic protection circuit according to claim 1, wherein the first voltage reference unit comprises a first voltage dividing module and a second voltage dividing module connected in series;
an input terminal of the first voltage dividing module is connected to the array substrate row driving signal line, an output terminal of the first voltage dividing module and an input terminal of the second voltage dividing module are both connected to the potential midpoint of the first voltage reference unit, and an output terminal of the second voltage dividing module is connected to the common electrode line.

3. The electrostatic protection circuit according to claim 2, wherein the first voltage dividing module comprises a first thin film field effect transistor and a second thin film field effect transistor, a gate of the first thin film field effect transistor, a first electrode of the first thin film field effect transistor, and a second electrode of the second thin film field effect transistor are all connected to the potential midpoint of the first voltage reference unit, and a second electrode of the first thin film field effect transistor, a gate of the second thin film field effect transistor, and a first electrode of the second thin film field effect transistor are all connected to the array substrate row driving signal line.

4. The electrostatic protection circuit according to claim 3, wherein the second voltage dividing module comprises a third thin film field effect transistor and a fourth thin film field effect transistor, a gate of the third thin film field effect transistor, a first electrode of the third thin film field effect transistor, and a second electrode of the fourth thin film field effect transistor are all connected to the common electrode line, and a second electrode of the third thin film field effect transistor, a gate of the fourth thin film field effect transistor, and a first electrode of the fourth thin film field effect transistor are all connected to the potential midpoint of the first voltage reference unit.

5. The electrostatic protection circuit according to claim 1, wherein the second voltage reference unit comprises a third voltage dividing module and a fourth voltage dividing module connected in series;
   a voltage dividing input terminal of the third voltage dividing module is connected to the array substrate row driving signal line, a reference voltage output terminal of the reference voltage output terminals corresponding to the third voltage dividing module is connected to at least one of the reference voltage input terminals of the charge releasing unit, and a voltage dividing output terminal of the third voltage dividing module and a voltage dividing input terminal of the fourth voltage dividing module are connected to the potential midpoint of the second voltage reference unit; and
   a reference voltage output terminal of the reference voltage output terminals corresponding to the fourth voltage dividing module is connected to the at least one of the reference voltage input terminals of the charge releasing unit, and a voltage dividing output terminal of the fourth voltage dividing module is connected to the common electrode line.

6. The electrostatic protection circuit according to claim 5, wherein the third voltage dividing module comprises a fifth thin film field effect transistor and a sixth thin film field effect transistor, a first electrode of the fifth thin film field effect transistor is connected to the array substrate row driving signal line, a gate electrode of the fifth thin film field effect transistor, a second electrode of the fifth thin film field effect transistor, and a first electrode of the sixth thin film field effect transistor are all connected to the reference voltage output terminal corresponding to the third voltage dividing module, and a gate of the sixth thin film field effect transistor and a second electrode of the sixth thin film field effect transistor are both connected with the potential midpoint of the second voltage reference unit.

7. The electrostatic protection circuit according to claim 6, wherein the fourth voltage dividing module comprises a seventh thin film field effect transistor and an eighth thin film field effect transistor, a gate of the seventh thin film field effect transistor and a first electrode of the seventh thin film field effect transistor are both connected to the potential midpoint of the second voltage reference unit; a second electrode of the seventh thin film field effect transistor, a gate of the eighth thin film field effect transistor, and a first electrode of the eighth thin film field effect transistor are all connected to the reference voltage output terminal corresponding to the fourth voltage dividing module; and a second electrode of the eighth thin film field effect transistor is connected to the common electrode line.

8. The electrostatic protection circuit according to claim 7, wherein the charge releasing unit comprises a ninth thin film field effect transistor, a gate of the ninth thin film field effect transistor is connected to the reference voltage output terminal corresponding to the third voltage dividing module and the reference voltage output terminal corresponding to the fourth voltage dividing module; a first electrode of the ninth thin film field effect transistor is connected to the array substrate row driving signal line, and a second electrode of the ninth thin film field effect transistor is connected to the common electrode line.

9. The electrostatic protection circuit of claim 5, wherein the third voltage dividing module comprises a fifth thin film field effect transistor, a sixth thin film field effect transistor, and a seventh thin film field effect transistor, wherein a first electrode of the fifth thin film field effect transistor is connected to the array substrate row driving signal line, a gate electrode of the fifth thin film field effect transistor, a second electrode of the fifth thin film field effect transistor, and a first electrode of the sixth thin film field effect transistor are all connected to a first reference voltage output terminal of the reference voltage output terminals corresponding to the third voltage dividing module; a gate of the sixth thin film field effect transistor, a second electrode of the sixth thin film field effect transistor, and a first electrode of the seventh thin film field effect transistor are all connected to a second reference voltage output terminal of the reference voltage output terminals corresponding to the third voltage dividing module; and a gate of the seventh thin film field effect transistor and a second electrode of the seventh thin film field effect transistor are both connected with the potential midpoint of the second voltage reference unit.

10. The electrostatic protection circuit according to claim 9, wherein the fourth voltage dividing module comprises an eighth thin film field effect transistor, a ninth thin film field effect transistor, and a tenth thin film field effect transistor, wherein a first electrode of the eighth thin film field effect transistor and a gate of the eighth thin film field effect transistor are connected to the potential midpoint of the second voltage reference unit; a second electrode of the eighth thin film field effect transistor, a gate of the ninth thin film field effect transistor, and a first electrode of the ninth thin film field effect transistor are all connected to a third reference voltage output terminal of the reference voltage output terminals corresponding to the fourth voltage dividing module; a second electrode of the ninth thin film field effect transistor, a gate of a tenth thin film field effect transistor, and a first electrode of the tenth thin film field effect transistor are all connected to a fourth reference voltage output terminal of the reference voltage output terminals corresponding to the fourth voltage dividing module; and a second electrode of the tenth thin film field effect transistor is connected to the common electrode line.

11. The electrostatic protection circuit according to claim 10, wherein the charge releasing unit comprises an eleventh thin film field effect transistor and a twelfth thin film field effect transistor;
   a gate of the eleventh thin film field effect transistor is connected to the first reference voltage output terminal and the third reference voltage output terminal; a first electrode of the eleventh thin film field effect transistor is connected to the array substrate row driving signal line; and a second electrode of the eleventh thin film field effect transistor and a first electrode of the twelfth thin film field effect transistor are connected; and
   a gate of the twelfth thin film field effect transistor is connected to the second reference voltage output terminal and the fourth reference voltage output terminal; and a second electrode of the twelfth thin film field effect transistor is connected to the common electrode line.

12. A display panel, comprising an electrostatic protection circuit connected between an array substrate row driving signal line and a common electrode line, wherein the electrostatic protection circuit comprises:

a first voltage reference unit configured to divide a voltage between the array substrate row driving signal line and the common electrode line for a first time;

a second voltage reference unit configured to divide the voltage between the array substrate row driving signal line and the common electrode line for a second time;

a charge releasing unit that adjusts charge distribution between the array substrate row driving signal line and the common electrode line based on reference voltages provided by the first voltage reference unit and the second voltage reference unit, wherein the first voltage reference unit, the second voltage reference unit, and the charge releasing unit are connected between the array substrate row driving signal line and the common electrode line, respectively;

a potential midpoint of the first voltage reference unit is connected to a potential midpoint of the second voltage reference unit; and at least two reference voltage output terminals of the second voltage reference unit are connected with reference voltage input terminals of the charge releasing unit.

13. The display panel according to claim 12, wherein the first voltage reference unit comprises a first voltage dividing module and a second voltage dividing module connected in series;

an input terminal of the first voltage dividing module is connected to the array substrate row driving signal line, an output terminal of the first voltage dividing module and an input terminal of the second voltage dividing module are both connected to the potential midpoint of the first voltage reference unit, and an output terminal of the second voltage dividing module is connected to the common electrode line.

14. The display panel according to claim 13, wherein the first voltage dividing module comprises a first thin film field effect transistor and a second thin film field effect transistor, a gate of the first thin film field effect transistor, a first electrode of the first thin film field effect transistor, and a second electrode of the second thin film field effect transistor are all connected to the potential midpoint of the first voltage reference unit, and a second electrode of the first thin film field effect transistor, a gate of the second thin film field effect transistor, and a first electrode of the second thin film field effect transistor are all connected to the array substrate row driving signal line; and the second voltage dividing module comprises a third thin film field effect transistor and a fourth thin film field effect transistor, a gate of the third thin film field effect transistor, a first electrode of the third thin film field effect transistor, and a second electrode of the fourth thin film field effect transistor are all connected to the common electrode line, and a second electrode of the third thin film field effect transistor, a gate of the fourth thin film field effect transistor, and a first electrode of the fourth thin film field effect transistor are all connected to the potential midpoint of the first voltage reference unit.

15. The display panel according to claim 12, wherein the second voltage reference unit comprises a third voltage dividing module and a fourth voltage dividing module connected in series;

a voltage dividing input terminal of the third voltage dividing module is connected to the array substrate row driving signal line, a reference voltage output terminal of the reference voltage output terminals corresponding to the third voltage dividing module is connected to at least one of the reference voltage input terminals of the charge releasing unit, and a voltage dividing output terminal of the third voltage dividing module and a voltage dividing input terminal of the fourth voltage dividing module are connected to the potential midpoint of the second voltage reference unit; and a reference voltage output terminal of the reference voltage output terminals corresponding to the fourth voltage dividing module is connected to the at least one of the reference voltage input terminals of the charge releasing unit, and a voltage dividing output terminal of the fourth voltage dividing module is connected to the common electrode line.

16. The display panel according to claim 15, wherein the third voltage dividing module comprises a fifth thin film field effect transistor and a sixth thin film field effect transistor, a first electrode of the fifth thin film field effect transistor is connected to the array substrate row driving signal line, a gate electrode of the fifth thin film field effect transistor, a second electrode of the fifth thin film field effect transistor, and a first electrode of the sixth thin film field effect transistor are all connected to the reference voltage output terminal corresponding to the third voltage dividing module, and a gate of the sixth thin film field effect transistor and a second electrode of the sixth thin film field effect transistor are both connected with the potential midpoint of the second voltage reference unit;

wherein the fourth voltage dividing module comprises a seventh thin film field effect transistor and an eighth thin film field effect transistor, a gate of the seventh thin film field effect transistor and a first electrode of the seventh thin film field effect transistor are both connected to the potential midpoint of the second voltage reference unit; a second electrode of the seventh thin film field effect transistor, a gate of the eighth thin film field effect transistor, and a first electrode of the eighth thin film field effect transistor are all connected to the reference voltage output terminal corresponding to the fourth voltage dividing module; and a second electrode of the eighth thin film field effect transistor is connected to the common electrode line.

17. The display panel according to claim 16, wherein the charge releasing unit comprises a ninth thin film field effect transistor, a gate of the ninth thin film field effect transistor is connected to the reference voltage output terminal corresponding to the third voltage dividing module and the reference voltage output terminal corresponding to the fourth voltage dividing module; a first electrode of the ninth thin film field effect transistor is connected to the array substrate row driving signal line, and a second electrode of the ninth thin film field effect transistor is connected to the common electrode line.

18. The display panel according to claim 15, wherein the third voltage dividing module comprises a fifth thin film field effect transistor, a sixth thin film field effect transistor, and a seventh thin film field effect transistor, wherein a first electrode of the fifth thin film field effect transistor is connected to the array substrate row driving signal line, a gate electrode of the fifth thin film field effect transistor, a second electrode of the fifth thin film field effect transistor, and a first electrode of the sixth thin film field effect transistor are all connected to a first reference voltage output terminal of the reference voltage output terminals corresponding to the third voltage dividing module; a gate of the sixth thin film field effect transistor, a second electrode of the sixth thin film field effect transistor, and a first electrode of the seventh thin film field effect transistor are all connected to a second reference voltage output terminal of the reference voltage output terminals corresponding to the third voltage dividing module; and a gate of the seventh thin film field effect transistor and a second electrode of the seventh thin film field effect transistor are both connected with the potential midpoint of the second voltage reference unit;

wherein the fourth voltage dividing module comprises an eighth thin film field effect transistor, a ninth thin film field effect transistor, and a tenth thin film field effect transistor, wherein a first electrode of the eighth thin film field effect transistor and a gate of the eighth thin film field effect transistor are connected to the potential midpoint of the second voltage reference unit; a second electrode of the eighth thin film field effect transistor, a gate of the ninth thin film field effect transistor, and a first electrode of the ninth thin film field effect transistor are all connected to a third reference voltage output terminal of the reference voltage output terminals corresponding to the fourth voltage dividing module; a second electrode of the ninth thin film field effect transistor, a gate of a tenth thin film field effect transistor, and a first electrode of the tenth thin film field effect transistor are all connected to a fourth reference voltage output terminal of the reference voltage output terminals corresponding to the fourth voltage dividing module; and a second electrode of the tenth thin film field effect transistor is connected to the common electrode line.

19. The display panel according to claim 18, wherein the charge releasing unit comprises an eleventh thin film field effect transistor and a twelfth thin film field effect transistor;

a gate of the eleventh thin film field effect transistor is connected to the first reference voltage output terminal and the third reference voltage output terminal; a first electrode of the eleventh thin film field effect transistor is connected to the array substrate row driving signal line; and a second electrode of the eleventh thin film field effect transistor and a first electrode of the twelfth thin film field effect transistor are connected; and a gate of the twelfth thin film field effect transistor is connected to the second reference voltage output terminal and the fourth reference voltage output terminal; and a second electrode of the twelfth thin film field effect transistor is connected to the common electrode line.

\* \* \* \* \*